United States Patent
Fukushi et al.

(10) Patent No.: US 8,675,970 B2
(45) Date of Patent: Mar. 18, 2014

(54) IMAGE PROCESSING APPARATUS, IMAGE PROCESSING METHOD, AND IMAGE PROCESSING PROGRAM

(75) Inventors: Gakuho Fukushi, Tokyo (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 13/159,839

(22) Filed: Jun. 14, 2011

(65) Prior Publication Data

US 2011/0317924 A1 Dec. 29, 2011

(30) Foreign Application Priority Data

Jun. 28, 2010 (JP) ................................ 2010-146664

(51) Int. Cl.
*G06K 9/48* (2006.01)

(52) U.S. Cl.
USPC ............ 382/199; 382/118; 382/218; 382/282

(58) Field of Classification Search
USPC .................... 382/190, 199, 218, 282
See application file for complete search history.

(56) References Cited

U.S. PATENT DOCUMENTS

| | | | | |
|---|---|---|---|---|
| 6,335,985 B1* | 1/2002 | Sambonsugi et al. | ........ | 382/190 |
| 6,766,055 B2* | 7/2004 | Matsugu et al. | .......... | 382/173 |
| 7,062,093 B2* | 6/2006 | Steger | ............ | 382/216 |
| 7,110,602 B2* | 9/2006 | Krause | ............ | 382/199 |
| 7,146,057 B2* | 12/2006 | Clark et al. | ............ | 382/242 |
| 7,283,645 B2* | 10/2007 | Krumm et al. | ............ | 382/103 |
| 7,697,792 B2* | 4/2010 | Keating et al. | ............ | 382/305 |
| 7,778,459 B2* | 8/2010 | Song | ............ | 382/166 |
| 8,068,670 B2* | 11/2011 | Muschler et al. | ............ | 382/173 |
| 8,120,665 B2* | 2/2012 | Maruyama et al. | ........ | 348/222.1 |
| 8,160,366 B2* | 4/2012 | Nakamura et al. | ............ | 382/190 |
| 2009/0109218 A1* | 4/2009 | Koseki et al. | ............ | 345/422 |
| 2009/0202124 A1 | 8/2009 | Matsuda et al. | | |
| 2010/0172598 A1* | 7/2010 | Kimura | ............ | 382/296 |
| 2011/0058096 A1* | 3/2011 | Chou et al. | ............ | 348/349 |
| 2011/0317924 A1* | 12/2011 | Fukushi et al. | ............ | 382/199 |
| 2012/0154579 A1* | 6/2012 | Hampapur et al. | ............ | 348/143 |
| 2013/0002866 A1* | 1/2013 | Hampapur et al. | ............ | 348/143 |

FOREIGN PATENT DOCUMENTS

JP 2008-093172 4/2008

* cited by examiner

*Primary Examiner* — Gregory M Desire
(74) *Attorney, Agent, or Firm* — K&L Gates LLP

(57) ABSTRACT

An image processing apparatus including: an edge detection processing section configured to generate an edge image by performing edge detection processing on a detection target image from which a target object is to be detected; a segment area setting section configured to segmentalize the edge image into a plurality of segment areas; an index value calculation section configured to calculate, for each of the plurality of segment areas, an edge component index value that indicates an amount of edge components included in each segment area; and a target object determining section configured to determine whether there is an image of the target object in each segment area based on the edge component index value.

7 Claims, 21 Drawing Sheets

A-axis direction  $-0.41 < \tan\theta < 0.41$
B-axis direction  $0.41 < \tan\theta \leq 2.41$
C-axis direction  $2.41 < \tan\theta$ or $\tan\theta \leq -2.41$
D-axis direction  $-2.41 < \tan\theta < -0.41$

|  | (b) | (c) | (d) |
|---|---|---|---|
| canny_min | 100 | 43 | 13 |
| canny_max | 200 | 119 | 13 |
| Edge image eligibility | ○ | △ | × |
| Determination accuracy | × | △ | ○ |

FIG.18A
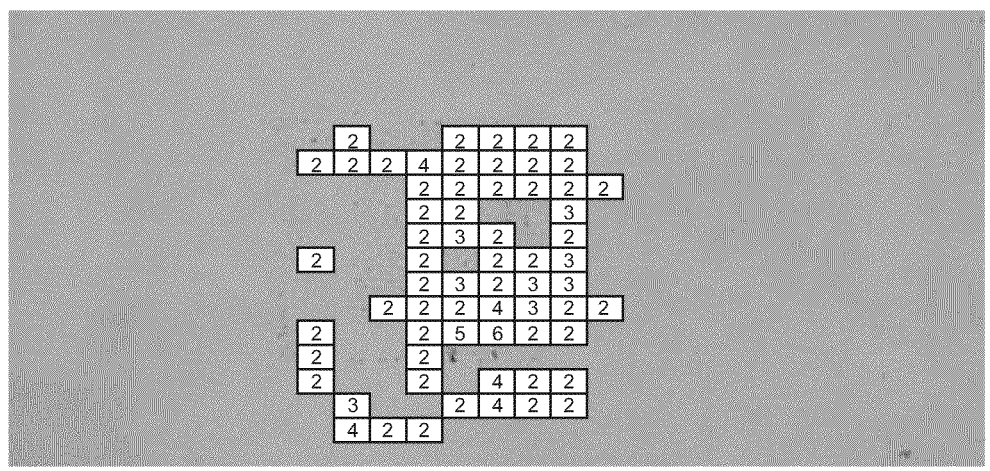
FIG.18B
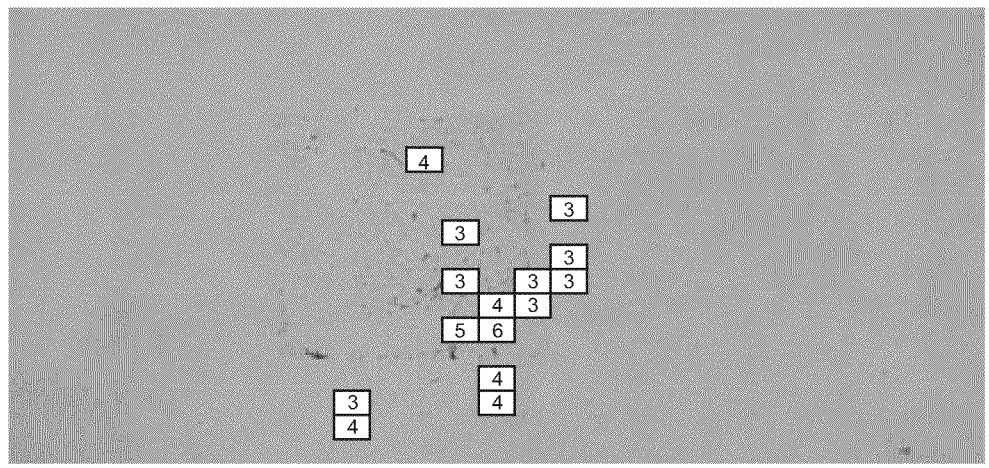
FIG.18C

IMAGE PROCESSING APPARATUS, IMAGE PROCESSING METHOD, AND IMAGE PROCESSING PROGRAM

CROSS REFERENCES TO RELATED APPLICATIONS

The present application claims priority to Japanese Priority Patent Application JP 2010-146664 filed in the Japan Patent Office on Jun. 28, 2010, the entire content of which is hereby incorporated by reference.

BACKGROUND

The present disclosure relates to an image processing apparatus, an image processing method, and an image processing program for detecting a target object from an image partially including an image of the target object.

In recent years, a technique for detecting an area including a target object from an image including a background and a target object, such as an image obtained by photographing a sample on a prepared slide, is being studied. If an area including a target object can be detected from an image without omission, image processing can be performed only on the detected image area, which is advantageous in terms of a reduction of an operation amount, a processing time, and the like.

For example, Japanese Patent Application Laid-open No. 2008-93172 (paragraph [0066], FIG. 3; hereinafter, referred to as Patent Document 1) discloses an "image processing apparatus" that uses change amounts of pixel values among adjacent pixels in an area detection. The image processing apparatus disclosed in Patent Document 1 calculates pixel value change amounts of a certain pixel and peripheral pixels within the same image and calculates whether there is a bias in the peripheral pixels. Then, the image processing apparatus detects an area where there is a pixel value change compared to peripheral pixels based on the pixel value change amounts of the peripheral pixels that takes a bias of the peripheral pixels into account.

SUMMARY

By the detection method as that disclosed in Patent Document 1, however, in a case where luminance of a target object and that of a background are close, that is, an image of the target object is faint, it may be difficult for the apparatus to detect the target object by extracting a difference between the luminance of the target object and that of the background. In such a case, it may become necessary for a user to finely adjust a parameter for the detection. Moreover, in a case where luminance of the entire image is uniform, there is a fear that parameters capable of favorably detecting the target object may concentrate in a minimal range so that it becomes difficult for the user to adjust the parameters.

In view of the circumstances as described above, there is a need for an image processing apparatus, an image processing method, and an image processing program with which a target object can be accurately detected from a background.

According to an embodiment, there is provided an image processing apparatus including an edge detection processing section, a segment area setting section, an index value calculation section, and a target object determining section.

The edge detection processing section is configured to generate an edge image by performing edge detection processing on a detection target image from which a target object is to be detected.

The segment area setting section is configured to segmentalize the edge image into a plurality of segment areas.

The index value calculation section is configured to calculate, for each of the plurality of segment areas, an edge component index value that indicates an amount of edge components included in each segment area.

The target object determining section is configured to determine whether there is an image of the target object in each segment area based on the edge component index value.

By the edge detection processing section performing the edge detection processing on the detection target image, luminance gradient among pixels included in the detection target image is emphasized, and pixels are binarized into an edge pixel and a non-edge pixel. Accordingly, if there is even a slight luminance gradient in the segment area, the luminance gradient is reflected on the edge component index value calculated by the index value calculation section, with the result that it becomes possible for the target object determining section to determine the segment area as a segment area where there is a target object. Therefore, even in the case of an image having a small luminance difference between the target object and the background, a segment area including the target object can be detected accurately.

The edge detection processing section may use a luminance gradient of the detection target image in the edge detection processing.

In the edge detection processing in normal image processing, a detection parameter that does not detect a minute luminance gradient as an edge is used for the adjustment. In the present application, however, since the edge detection processing section detects a minute luminance gradient as an edge, even a target object having a small luminance difference compared to the background affects the edge component index value so that the target object can be detected by the target object determining section.

The edge detection processing section may perform the edge detection processing based on a detection parameter that defines a level of the luminance gradient detected as an edge, the detection parameter being instructed by a user.

According to the present application, by the user instructing the edge detection processing section to use a detection parameter that detects even a minute luminance gradient as an edge, it becomes possible for the target object determining section to detect a target object having a small luminance difference compared to the background.

The edge detection processing section may use a Canny algorithm as an algorithm of the edge detection processing.

The Canny algorithm is an algorithm that determines which of an edge pixel and a non-edge pixel a pixel that is hard to be determined as being either one is, based on information on adjacent pixels, and the edge pixel can be extracted more positively with this algorithm than with other algorithms. In other words, by the edge detection processing section using the Canny algorithm in the edge detection processing, an object can be detected accurately.

According to another embodiment, there is provided an image processing method including generating, by an edge detection processing section, an edge image by performing edge detection processing on a detection target image from which a target object is to be detected.

A segment area setting section segmentalizes the edge image into a plurality of segment areas.

An index value calculation section calculates, for each of the plurality of segment areas, an edge component index value that indicates an amount of edge components included in each segment area.

A target object determining section determines whether there is an image of the target object in each segment area based on the edge component index value.

According to another embodiment of the present invention, there is provided an image processing program causing a computer to function as an edge detection processing section, a segment area setting section, an index value calculation section, and a target object determining section.

The edge detection processing section is configured to generate an edge image by performing edge detection processing on a detection target image from which a target object is to be detected.

The segment area setting section is configured to segmentalize the edge image into a plurality of segment areas.

The index value calculation section is configured to calculate, for each of the plurality of segment areas, an edge component index value that indicates an amount of edge components included in each segment area.

The target object determining section is configured to determine whether there is an image of the target object in each segment area based on the edge component index value.

According to the embodiments, it is possible to provide an image processing apparatus, an image processing method, and an image processing program with which a target object can be accurately detected from a background.

Additional features and advantages are described herein, and will be apparent from the following Detailed Description and the figures.

BRIEF DESCRIPTION OF THE FIGURES

FIG. 14 is a table showing edge parameters of each image shown in FIG. 13;

FIGS. 17A-B are diagrams showing examples of a standard deviation of each segment area according to the embodiment and the comparative example;

FIGS. 18A-C are diagrams showing results of adjusting a determination parameter according to the comparative example;

DETAILED DESCRIPTION

Embodiments of the present application will be described below in detail with reference to the drawings.

Structure of Image Processing Apparatus

Figure 1:
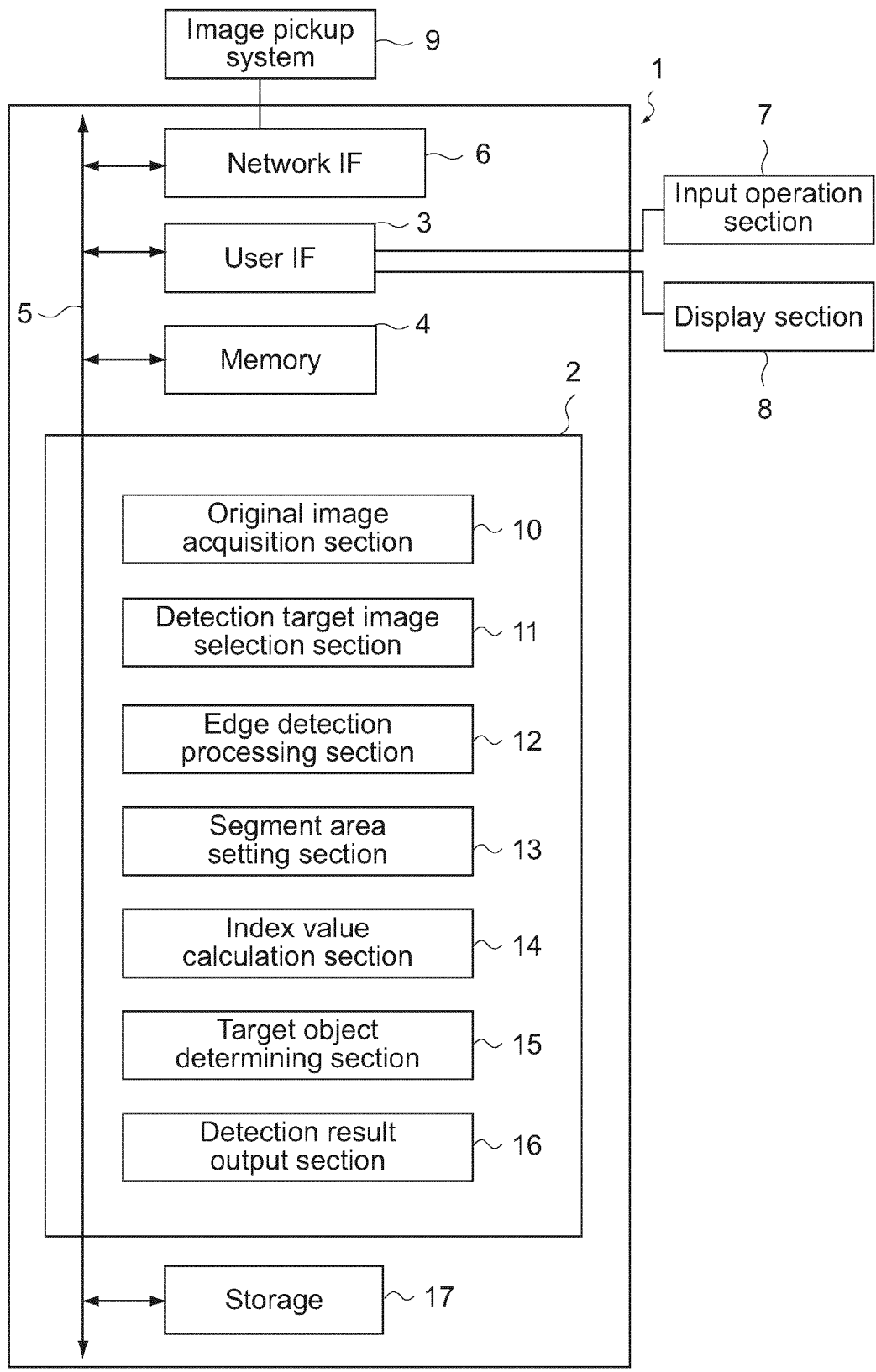
FIG. 1 is a block diagram showing a structure of an image processing apparatus according to an embodiment.

FIG. 1 is a block diagram showing a structure of an image processing apparatus 1 according to an embodiment.

As shown in the figure, the image processing apparatus 1 includes an operational processing section 2, a user interface (hereinafter referred to as user IF) 3, a memory 4, a network interface (hereinafter, referred to as network IF) 6, and a storage 17, which are mutually connected via an internal bus 5.

The user IF 3 connects the internal bus 5 and an external device. Connected to the user IF 3 are an input operation section 7 such as a keyboard and a mouse and a display section 8 for displaying an image. The memory 4 is, for example, a ROM (Read Only Memory) and a RAM (Random Access Memory) and stores image data to be processed, programs, and the like. The network IF 6 connects an external network and the internal bus 5. Connected to the network IF 6 is an image pickup system 9 capable of picking up an image. In this embodiment, an image is taken by the image pickup system 9, and the taken image is stored in the storage 17 via the network IF 6 and the internal bus 5.

The operational processing section 2 is, for example, a microprocessor, and carries out operational processing to be described later. The operational processing section 2 functionally includes modules of an original image acquisition section 10, a detection target image selection section 11, an edge detection processing section 12, a segment area setting section 13, an index value calculation section 14, a target object determining section 15, and a detection result output section 16. These modules are executed by programs stored inside or outside the operational processing section 2.

Regarding Modules

The original image acquisition section 10 acquires an "original image" stored in the storage 17 and stores it in the memory 4. The detection target image selection section 11 selects a "detection target image" to be a detection target from the original image. The edge detection processing section 12 performs "edge detection processing" on the detection target image and generates an edge image. The segment area setting section 13 sets "segment areas" in the edge image. The index value calculation section 14 calculates an "edge component index value" that indicates an amount of edge components included in each segment area. The target object determining section 15 determines, for each segment area, whether an image of a target object is included based on the edge component index value. The detection result output section 16 outputs the determination result of the target object determining section 15 in a form of, for example, a text map.

Operation of Image Processing Apparatus

An operation of the image processing apparatus 1 will be described.

The image processing apparatus 1 of this embodiment performs image processing on an "original image" that has been taken by the image pickup system 9 and stored in the storage 17 to detect an area where there is an image of a target object. Schematically, the original image acquisition section 10 acquires the original image from the storage 17, and the detection target image selection section 11 selects a "detection target image" upon receiving an input of a user instruction. Next, the edge detection processing section 12 performs edge detection processing on the detection target image and generates an "edge image". Subsequently, the segment area setting section 13 sets "segment areas" in the edge image, and the index value calculation section 14 calculates an edge component index value (standard deviation of luminance values in this case) for each of the segment areas. The target object determining section 15 determines whether each segment area includes an image of the target object based on the edge component index value, and the detection result output section 16 outputs the determination result.

Figure 2:
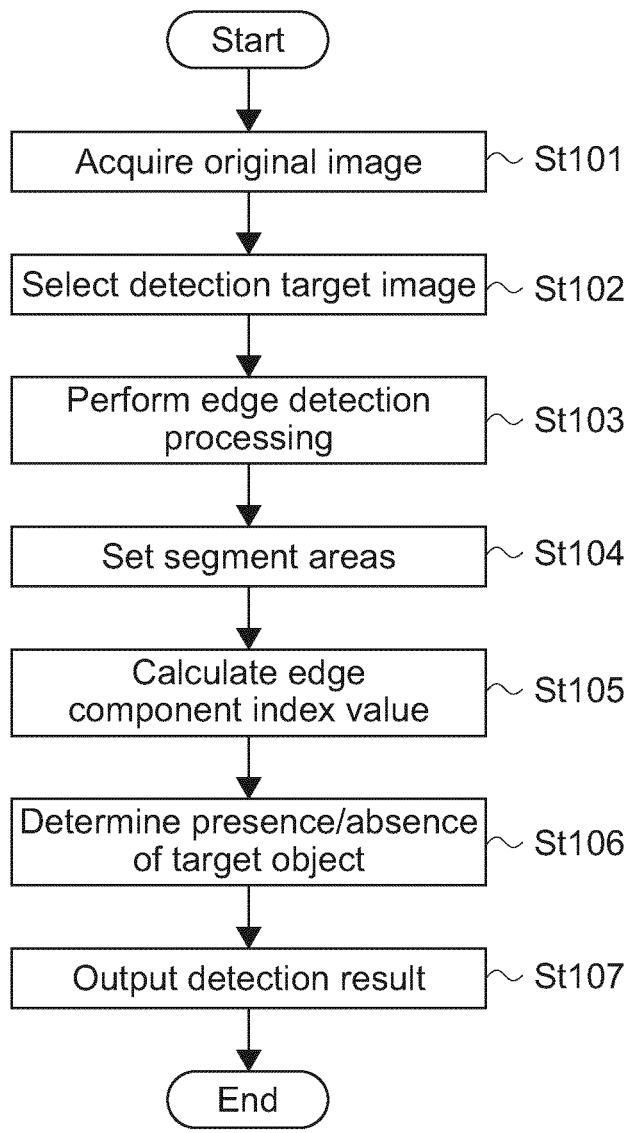
FIG. 2 is a flowchart showing an operation of the image processing apparatus according to the embodiment.

FIG. 2 is a flowchart showing the operation of the image processing apparatus 1. FIG. 2 shows the operation of the image processing apparatus 1 stepwise (hereinafter, notated by St).

Figure 3:
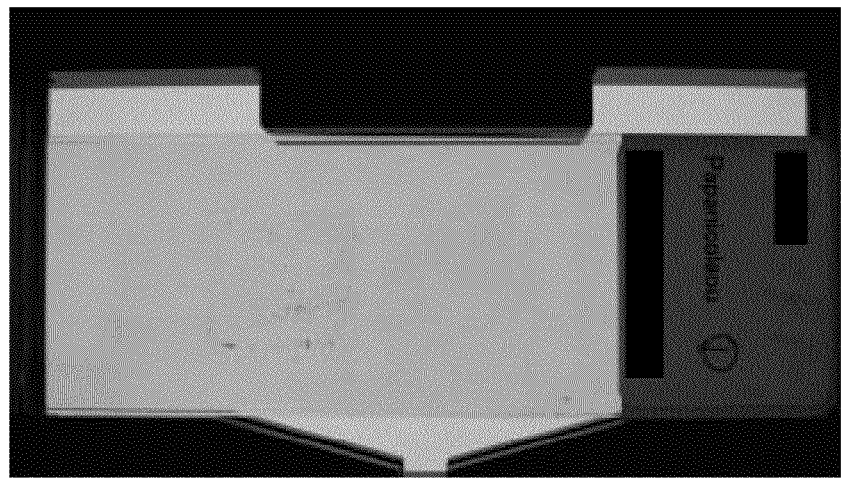
FIG. 3 is an example of an original image acquired by an original image acquisition section of the image processing apparatus according to the embodiment.

When an instruction to start processing is input by a user, the original image acquisition section 10 acquires an original image via the user IF 3 (St 101). FIG. 3 shows an example of the original image. Here, an image obtained by photographing a pathological tissue (target object) placed on a prepared slide is used as the original image. It should be noted that although the photograph shown in FIG. 3 is a monochrome image, the photograph may be a color image instead. For example, an image obtained by photographing a sample that has been subjected to hematoxylin-eosin staining (HE staining) can be used as the original image. Moreover, the original image acquisition section 10 may acquire an image that has been subjected to "color conversion processing" to be described later as the original image.

Figure 4:
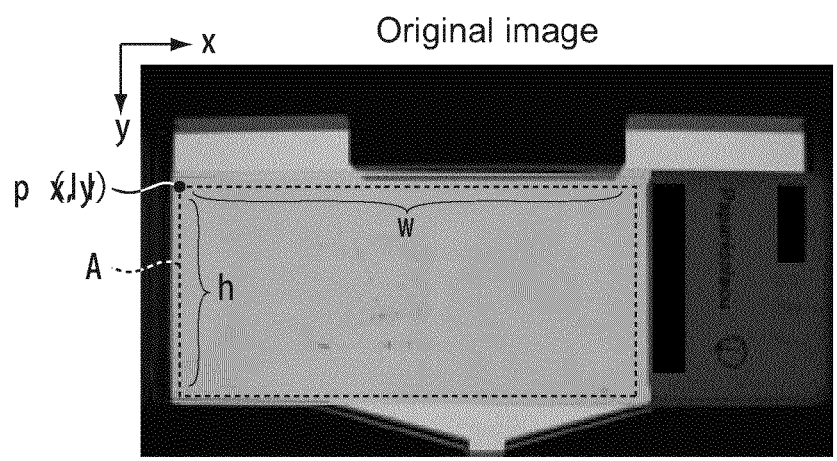
FIG. 4 is an example of a detection target image selected by a detection target image selection section of the image processing apparatus according to the embodiment.
Figure 4:
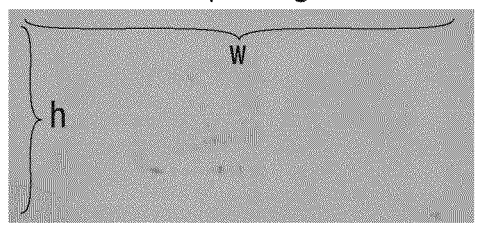

Next, the detection target image selection section 11 selects a "detection target image" (hereinafter, referred to as "crop image") from the original image (St 102). When there is an area where there is apparently no target object in the original image (area outside prepared slide in FIG. 3) as shown in FIG. 3, the image processing apparatus 1 performs the detection processing on the detection target image excluding such an area. FIG. 4 shows a crop image selected from the original image.

As a specific selection operation, when the user designates a point p (coordinates 1x, 1y), a width w, and a height h, the detection target image selection section 11 selects an area surrounded by 4 coordinates of (1x, 1y), (1x+w, 1y (1x, 1y+h), and (1w+w, 1y+h) as a crop image. Further, when there is no area to be excluded in the original image, the image processing apparatus 1 selects the entire original image as the crop image. It should be noted that the image processing apparatus 1 may generate an image different from the original image as the crop image, or handle an area designated virtually in the original image as the crop image.

Figure 5:
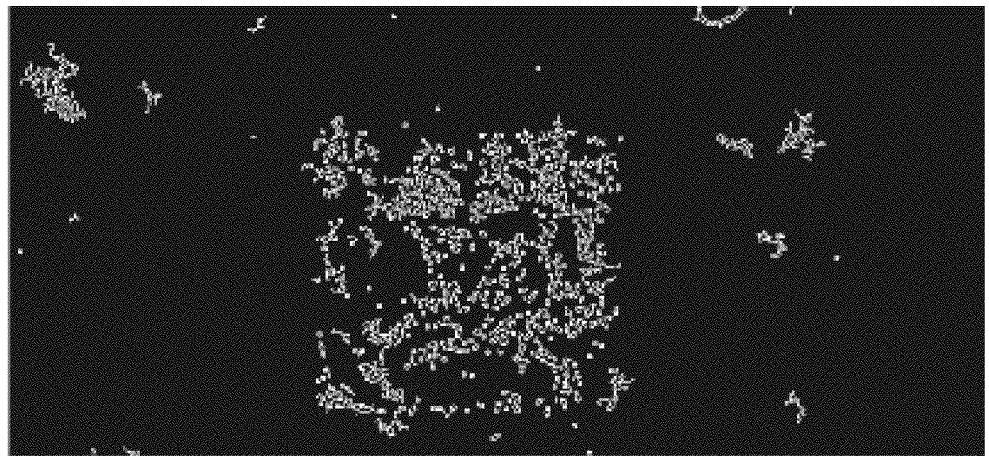
FIG. 5 is an example of an edge image generated by an edge detection processing section of the image processing apparatus according to the embodiment.

Referring back to FIG. 2, the edge detection processing section 12 performs edge detection processing on the crop image and generates an edge image (St 103). FIG. 5 shows an example of the edge image generated from the crop image shown in FIG. 4. As shown in FIG. 5, the edge image is an image in which pixels are binarized into pixels corresponding to edges of a crop image (here, edge refers to boundary of luminance values and does not necessarily refer to outline of object) (shown in white) and pixels other than that (shown in black). Details of the edge detection processing will be given later.

Figure 6:
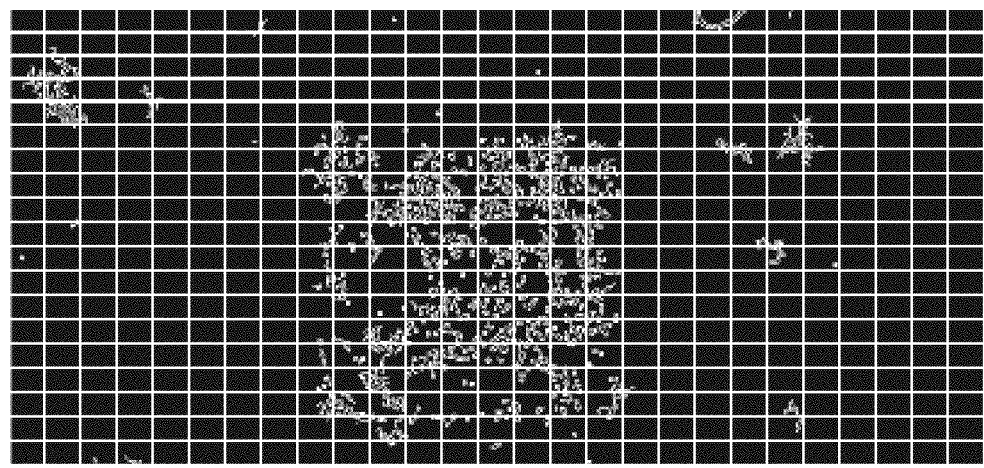
FIG. 6 is an example of an edge image in which segment areas are set by a segment area setting section of the image processing apparatus according to the embodiment.

Subsequently, the segment area setting section 13 sets "segment areas" in the edge image (St 104). FIG. 6 shows an example of the edge image in which segment areas are set. Areas sectioned by white lines in the figure are segment areas. As shown in the figure, the segment areas are areas that are obtained by sectioning the edge image into a plurality of areas in the longitudinal and lateral directions. Sizes of the segment areas are all the same, and the user can designate the size based on resolution.

Referring back to FIG. 2, the index value calculation section 14 calculates an "edge component index value" for each segment area (St 105). The edge component index value is an index value that represents how many pixels corresponding to the edge are included in each segment area. As the index value, a standard deviation of pixel values (luminance), a content rate of pixels corresponding to an edge in a segment area, or the like can be used. It should be noted that in this embodiment, descriptions will be given on the case where a standard deviation of pixel values (luminance) is used as the index value.

Figure 7:
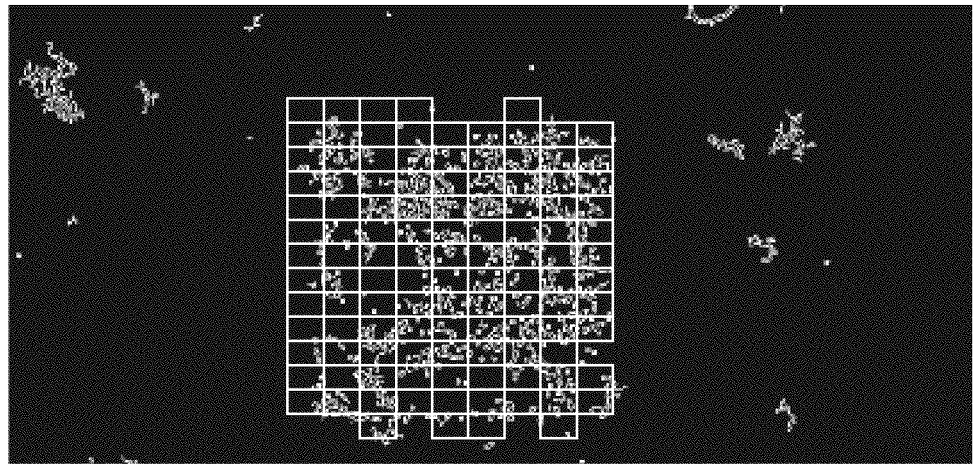
FIG. 7 is an example of an edge image in which a detection area determined by a target object determining section of the image processing apparatus according to the embodiment is displayed.
Figure 8:
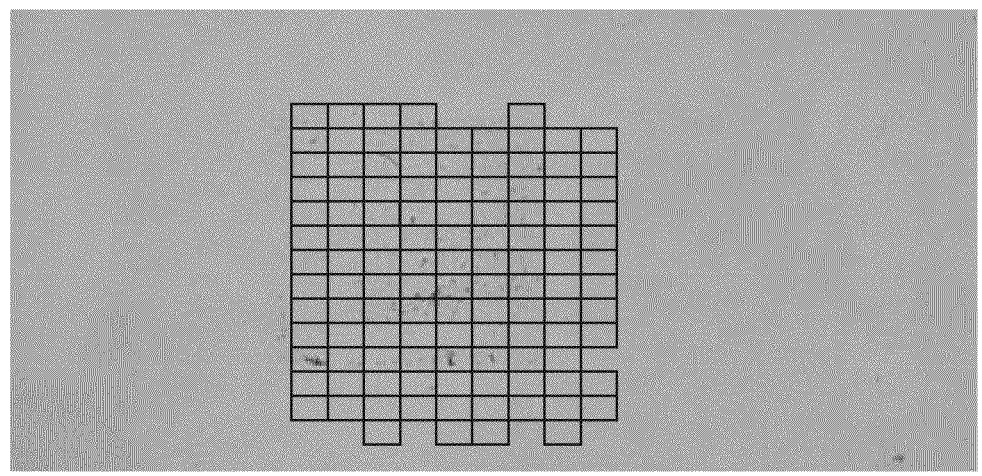
FIG. 8 is an example of a detection target image in which a detection area determined by the target object determining section of the image processing apparatus according to the embodiment is displayed.

Next, the target object determining section 15 determines presence/absence of a target object (St 106). The target object determining section 15 compares the edge component index value of each segment area and a parameter for a determination designated by the user (hereinafter, referred to as determination parameter). A segment area where the edge component index value is equal to or larger than the determination parameter is determined as a segment area where the target object is present (hereinafter, referred to as detection area), and a segment area where the edge component index value is smaller than the determination parameter is determined as a segment area where there is no target object (hereinafter, referred to as undetected area). Although details will be given later, at this time, by an adjustment of the determination parameter by the user, an area where the target object is determined to be present fluctuates. FIG. 7 shows an edge image displaying detection areas. In the figure, only the detection areas are shown as areas sectioned by white lines. FIG. 8 shows a crop image displaying the detection areas. As shown in the figure, in the crop image, areas where the target object is present are determined as the detection areas, and an area where there is no target object is determined as an undetected area.

Figures 9, 10:
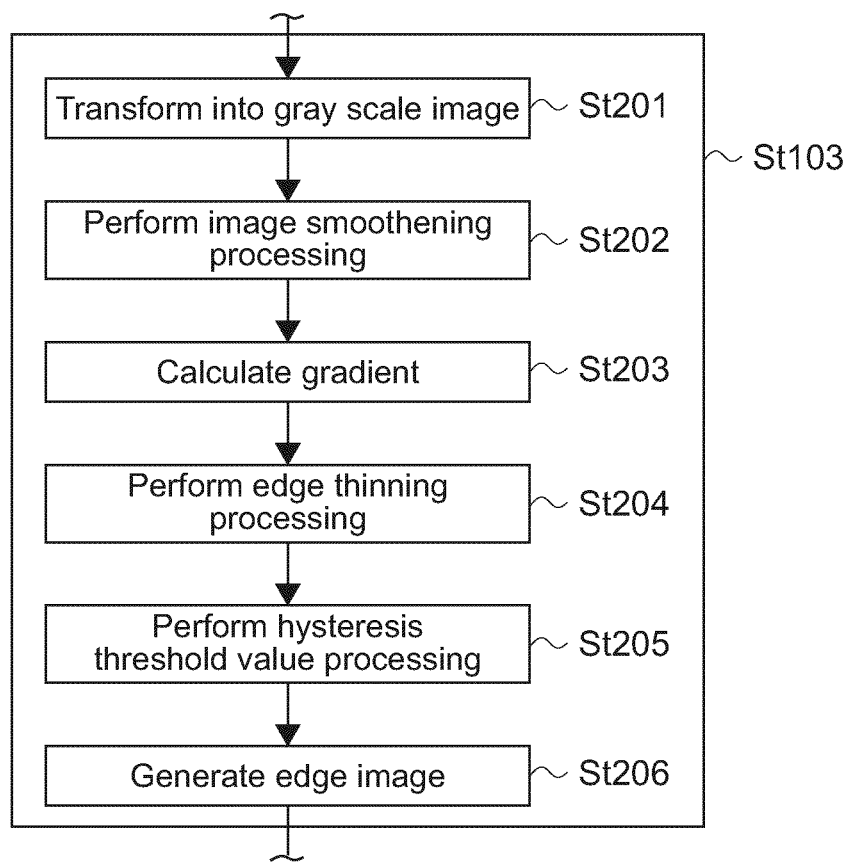
FIG. 9 is an example of a detection area presence map output by a detection result output section of the image processing apparatus according to the embodiment.
FIG. 10 is a flowchart showing details of the edge detection processing of the image processing apparatus according to the embodiment.

Referring back to FIG. 2, the detection result output section 16 outputs the detection result of Step 106 (St 107). The detection result output section 16 creates a presence map that expresses the detection area as 1 and the undetected area as 0 as shown in FIG. 9, for example, and outputs the map. As described above, areas where the target object is present and areas where there is no target object are both detected in the crop image. By using the detection result, areas can be narrowed down to areas where the target object is present so that a more-specific image analysis and the like can be performed on those areas.

Details of Edge Detection Processing

Details of the edge detection processing (Step 103 described above) will be described. FIG. 10 is a flowchart specifically showing the edge detection processing. A Canny algorithm is used in the edge detection processing of this embodiment. It should be noted that it is also possible to carry out the edge detection processing using other algorithms.

First, the edge detection processing section 12 converts the crop image into a gray scale image (St 201). The crop image shown in FIG. 4 is originally a color image though converted into a gray scale image, which is a necessary procedure. The gray scale transform can be carried out by the following expression.

$$Y = -0.299R + 0.587G + 0.114B \quad \text{(Expression 1)}$$

Y: Pixel Value, R: Red Component, G: Green Component, B: Blue Component

Next, the edge detection processing section 12 carries out image smoothening processing on the gray scale crop image (St 202). The edge detection processing section 12 applies a filter for smoothening, specifically, a Gaussian filter to the gray scale crop image and generates a noise-suppressed image. As a result, a "mess" caused in a gradient calculation to be described later can be suppressed.

Subsequently, the edge detection processing section 12 carries out the "gradient calculation" (St 203). The gradient calculation is for calculating how much difference in luminance values there is between a certain pixel and adjacent pixels. In descriptions below, a specific calculation method in the gradient calculation will be described. When a luminance value of a certain pixel (coordinates (a, b)) of a crop image smoothened in Step 202 is represented by f (a, b), a gradient vector is calculated for all pixels using the expression shown in the following [Formula 1]. The edge detection processing section 12 stores the gradient vector as a gradient map in association with the pixel coordinates.

$$\nabla f(a, b) = \left( \frac{\partial f(a, b)}{\partial x}, \frac{\partial f(a, b)}{\partial y} \right) \quad \text{Formula 1}$$

The gradient vector is a physical amount that indicates how much difference in luminance values there is between a certain pixel and adjacent pixels. Based on a value of an x component of a gradient vector shown in [Formula 2] and a value of a y component shown in [Formula 3], a direction θ of the gradient vector can be calculated by the expression shown in [Formula 4].

$$\nabla f_x(a, b)\left( = \frac{\partial f(a, b)}{\partial x} \right) \quad \text{Formula 2}$$

$$\nabla f_y(a, b)\left( = \frac{\partial f(a, b)}{\partial y} \right) \quad \text{Formula 3}$$

$$\theta(a, b) = \tan^{-1}(\nabla f_y(a, b)/\nabla f_x(a, b))$$
$$= \tan^{-1}\left( \frac{\partial f(a, b)}{\partial y} \Big/ \frac{\partial f(a, b)}{\partial x} \right) \quad \text{Formula 4}$$

Further, a level of the gradient vector can be calculated as a norm using the expression shown in [Formula 5]. The edge detection processing section 12 also stores norm information in the gradient map.

$$\|\nabla f(a, b)\| = \sqrt{\left( \frac{\partial f(a, b)}{\partial x} \right)^2 + \left( \frac{\partial f(a, b)}{\partial y} \right)^2} \quad \text{Formula 5}$$

The gradient calculation in normal image processing can be calculated by discretization of image data, and the gradient among adjacent pixels can be calculated using differentials as in the expressions shown in [Formula 6] and [Formula 7].

$$\nabla f_x(a,b) \approx f(a+1,b) - f(a,b) \quad \text{Formula 6}$$

$$\nabla f_y(a,b) \approx f(a,b+1) - f(a,b) \quad \text{Formula 7}$$

Figure 11:
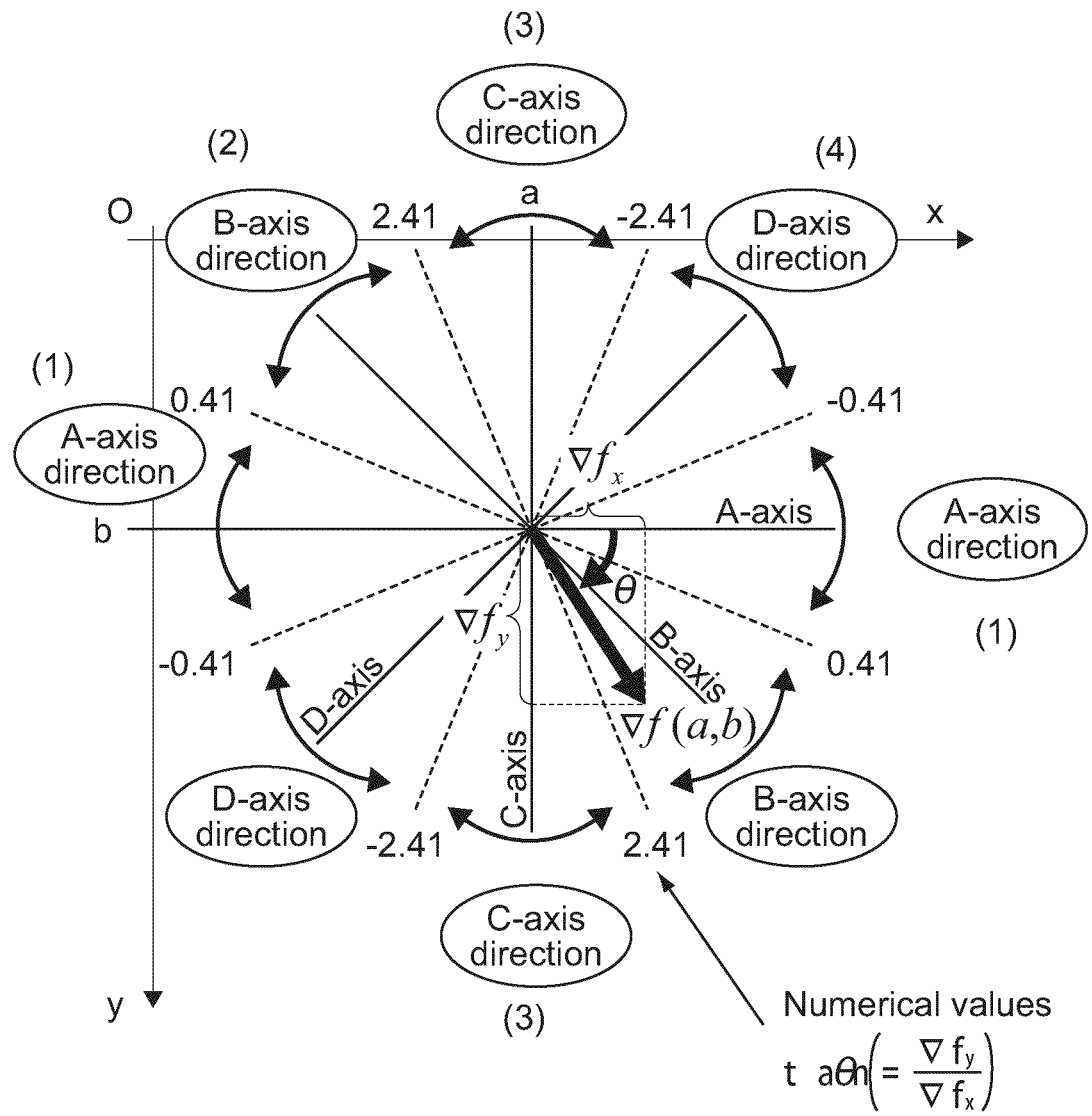
FIG. 11 is a diagram for explaining a gradient calculation of the edge detection processing of the image processing apparatus according to the embodiment.
Figure 11:
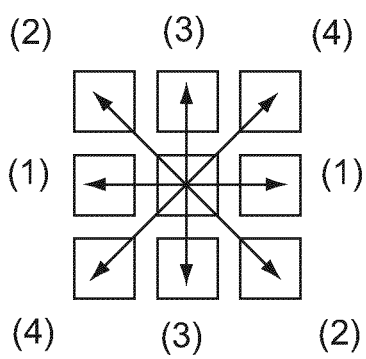

In this embodiment, values of Δfx and Δfy are calculated using a Sobel filter obtained by expanding this into a 3*3 area. It should be noted that instead of the Sobel filter, a Prewitt filter, a Laplacian filter, or the like may be used. FIG. 11 is a diagram for explaining the gradient calculation of this embodiment. In this embodiment, for speed-up, a categorization is made in four directions of axes A to D by a value of tan θ as shown in FIG. 11 instead of calculating an accurate θ by an inverse function operation of the actual tan. As a result, the pixel being focused is considered to have a gradient direction with respect to any of the adjacent pixels as long as it as a gradient (norm is not 0). The edge detection processing section 12 also stores the gradient direction in the gradient map.

Figure 12:
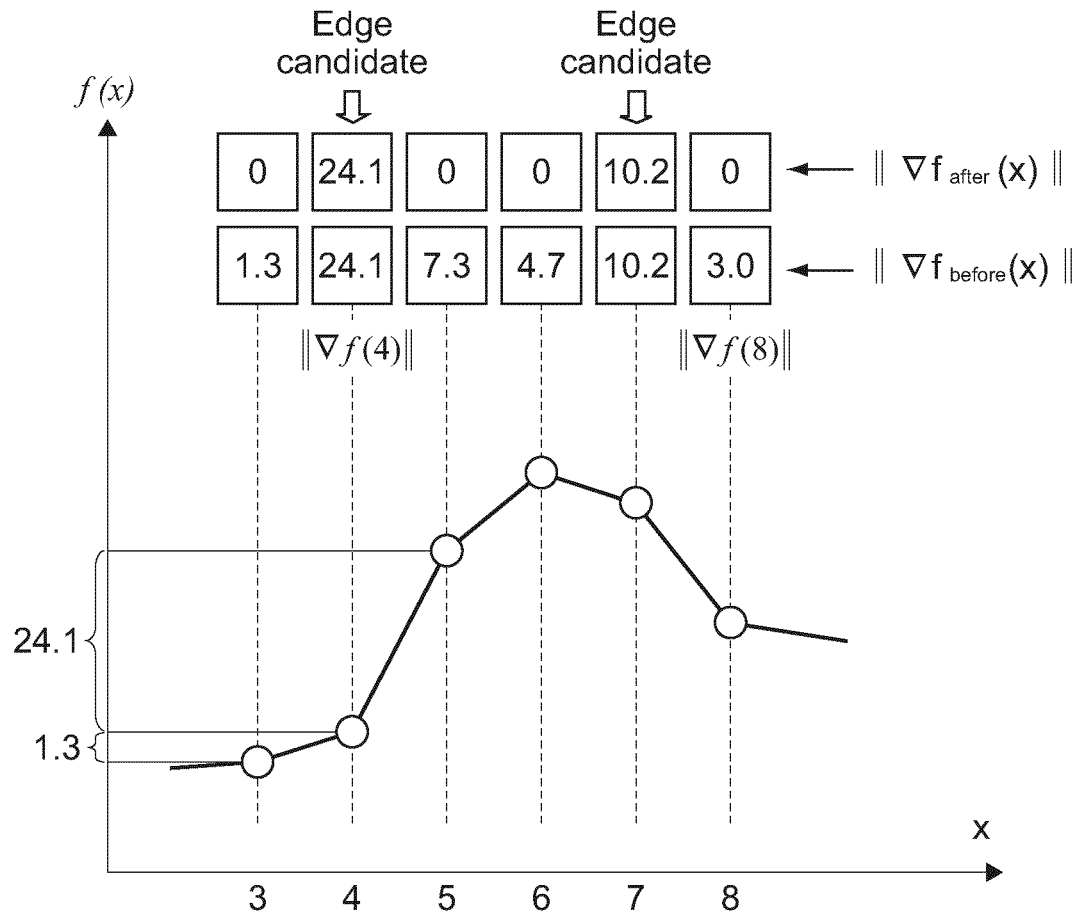
FIG. 12 is a diagram for explaining edge thinning processing in the edge detection processing of the image processing apparatus according to the embodiment.
Figure 12:
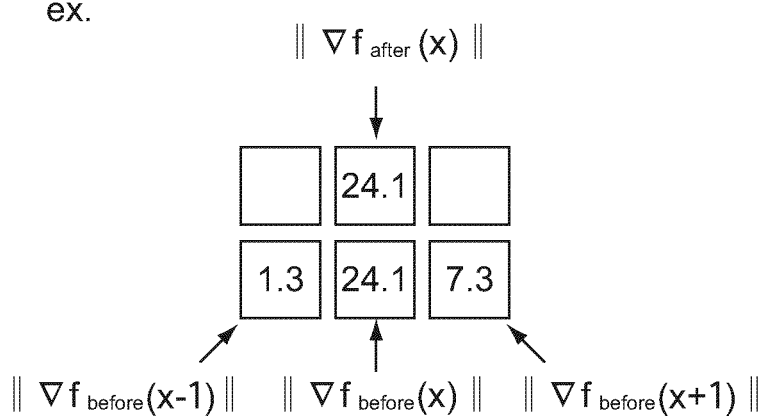

Subsequently, the edge detection processing section 12 carries out edge thinning processing (St 204). FIG. 12 is a diagram for explaining the edge thinning processing. Since the gradient direction has been determined with respect to the focus pixel in Step 203, the edge detection processing section 12 compares sizes of gradient vectors of a total of 3 pixels, that is, the focus pixel and two pixels sandwiching the focus pixel along the gradient direction. The edge detection processing section 12 carries out processing for maintaining a size of a gradient vector of a focus pixel only when the focus pixel is forming a peak.

Specifically, when, with the sizes of gradient vectors of the 3 pixels being represented by //∇f$_{before}$(x−1)//, //∇f$_{before}$(x)//, and ∇f$_{before}$(x+1)//, //∇f$_{before}$(x−1)//<//∇f$_{before}$(x)// and //∇f$_{before}$(x)//<//∇f$_{before}$(x+1)// are established, the edge detection processing section 12 sets the size of the processed gradient vector to be //∇f$_{after}$(x)//=//∇f$_{before}$(x)//. Further, when those are not established, the edge detection processing section 12 sets the size to be //∇f$_{after}$(x)//=0. The edge detection processing section 12 also stores //∇f$_{after}$(x)// determined as described above in the gradient map.

Accordingly, by extracting only a part that forms a peak in the gradient direction, a line segment having a certain thickness can be used as a thin line segment. Specifically, a pixel in which that value is other than 0 is an edge candidate pixel. In actuality, this processing is carried out in any of the gradient directions with respect to the focus pixel (directions (1) to (4) in FIG. 11).

Subsequently, the edge detection processing section 12 carries out hysteresis threshold value processing (St 205). As described above, in the gradient map, a pixel in which $\blacktriangledown f_{after}(x)$ is not 0 is an edge candidate pixel. The edge detection processing section 12 determines whether to eventually determine the pixel as an edge pixel based on two parameters. Hereinafter, the parameters will be referred to as edge parameters. Specifically, with the two edge parameters being canny_min and canny_max, the edge detection processing section 12 determines that x is an edge pixel when $\blacktriangledown f_{after}(x) >$ canny_max and determines that x is a non-edge pixel when $\blacktriangledown f_{after}(x) <$ canny_min. Otherwise, the edge detection processing section 12 determines x as a reserve pixel. It should be noted that details of the values of canny_min and canny_max will be given later. Here, the edge pixel is definitely a pixel that structures an edge, and the non-edge pixel is definitely a pixel that does not structure an edge. The edge detection processing section 12 determines that the reserve pixel is an edge pixel if the reserve pixel is directly connected to any of the edge pixels or connected via a reserve pixel, and determines that the reserve pixel is a non-edge pixel in other cases. As a result, the edge detection processing section 12 determines which of the edge pixel and the non-edge pixel the pixel is for all the pixels. As described above, the edge detection processing section 12 can extract an edge portion more positively than in a case where a determination is made using a single parameter.

As described above, the Canny algorithm is an algorithm that determines which of an edge pixel and a non-edge pixel a pixel that is hard to be determined as being either one is, based on information on adjacent pixels, and the edge pixel can be extracted more positively with this algorithm than with other algorithms. In other words, by the edge detection processing section 12 using the Canny algorithm in the edge detection processing, a target object can be detected accurately.

Subsequently, the edge detection processing section 12 generates an edge image (St 206). Since the determination on which of the edge pixel and the non-edge pixel the pixel is has been made on all the pixels in Step 205, the edge detection processing section 12 generates a binary image in which the edge pixel is 1 and the non-edge pixel is 0. As described above, the edge detection processing is ended.

Adjustment of Edge Parameter

As described above, to which of the edge pixel, the non-edge pixel, and the reserve pixel a certain pixel corresponds is determined based on the values of the edge parameters (canny_max and canny_min). In other words, by the user adjusting the values of canny_max and canny_min, a level of detecting a pixel as an edge can be changed. FIG. 13 are schematic diagrams showing an influence of edge parameters on an edge image. FIG. 14 is a table showing parameters of the images shown in FIG. 13.

Figure 13A:
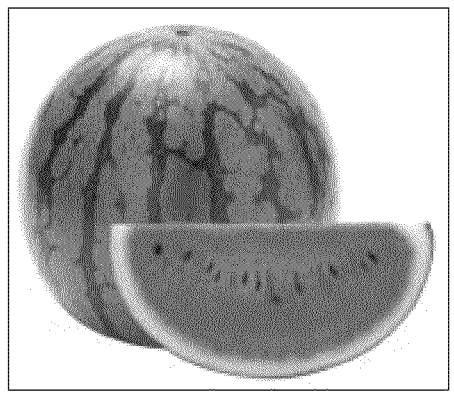
FIGS. 13A-D are conceptual diagrams showing an effect of an edge image using an edge parameter.
Figure 13B:
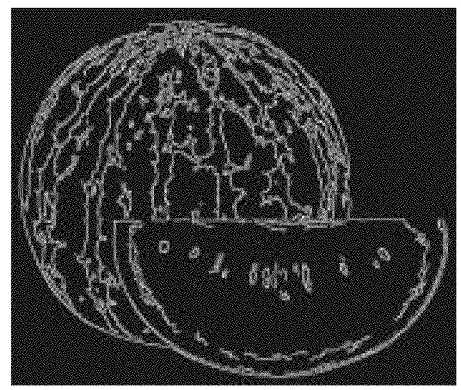
Figure 13C:
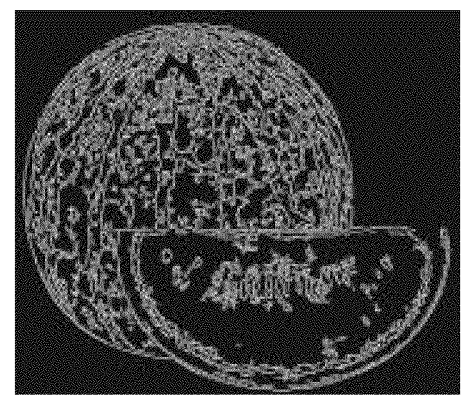
Figure 13D:
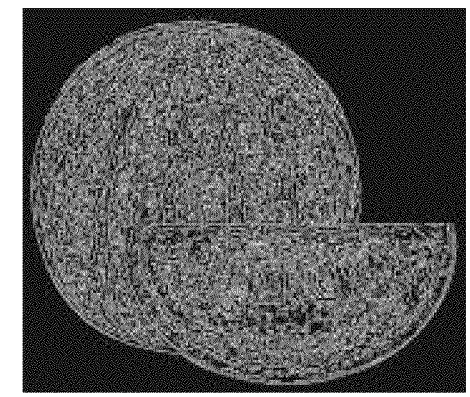

FIG. 13A is a sample image, and FIGS. 13B, 13C, and 13D are edge images generated by performing edge detection processing on the sample image shown in FIG. 13A using the edge parameters shown in FIG. 14. As shown in the figures, different edge parameters lead to different luminance differences detected as edges, with the result that edge images differ. Specifically, with large canny_max and canny_min, only portions with large luminance differences are detected as edges as shown in FIG. 13B. On the other hand, with small canny_max and canny_min, portions with small luminance differences are also detected as edges as shown in FIG. 13D.

In the field of image processing and the like, the image shown in FIG. 13B in which outlines and patterns of objects are extracted is eligible, and the image shown in FIG. 13D in which even a minute luminance difference is extracted is ineligible. In this embodiment, however, for extracting a minute luminance difference of a pale target object without omission, the edge parameter with which a minute luminance difference is extracted as shown in FIG. 13B is used favorably.

Effect of Embodiment

Figure 15:
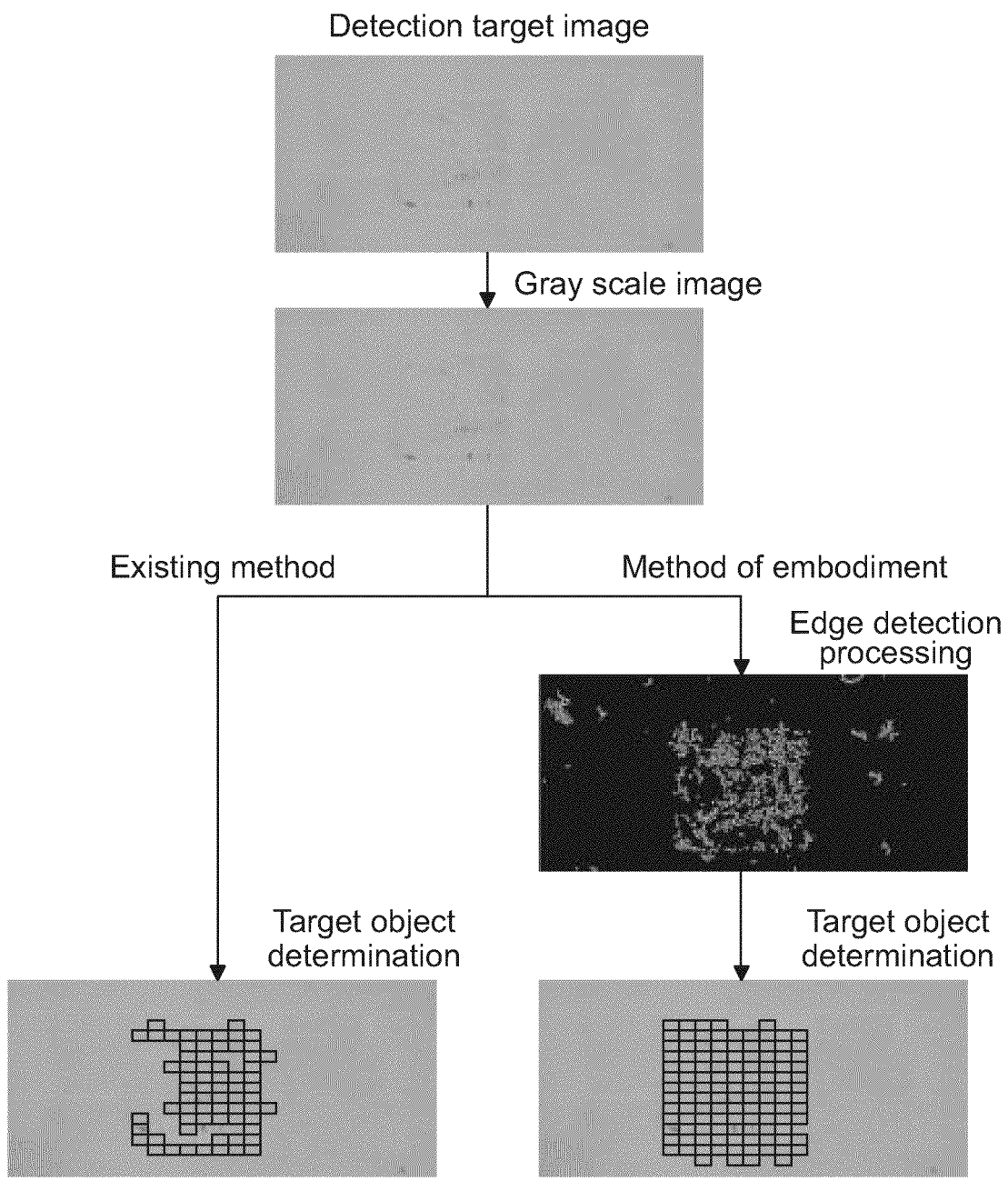
FIG. 15 is a diagram showing a processual difference between the embodiment and a comparative example.

The detection of a target object using the method of this embodiment will be described while comparing it with a comparative example. FIG. 15 is a diagram showing a processual difference between this embodiment and the comparative example. As shown in FIG. 15, a method of setting segment areas after converting a detection target image into a gray scale image, calculating a standard deviation of luminance values of the segment areas, and determining presence/absence of a target object in each segment area using the standard deviation will be discussed as the comparative example.

Figure 16A:
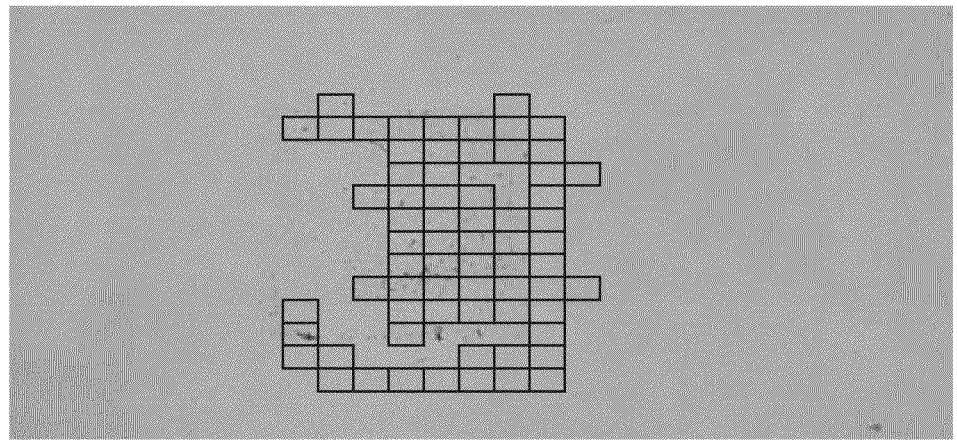
FIGS. 16A-B are diagrams showing examples of detection results of the embodiment and the comparative example.
Figure 16B:
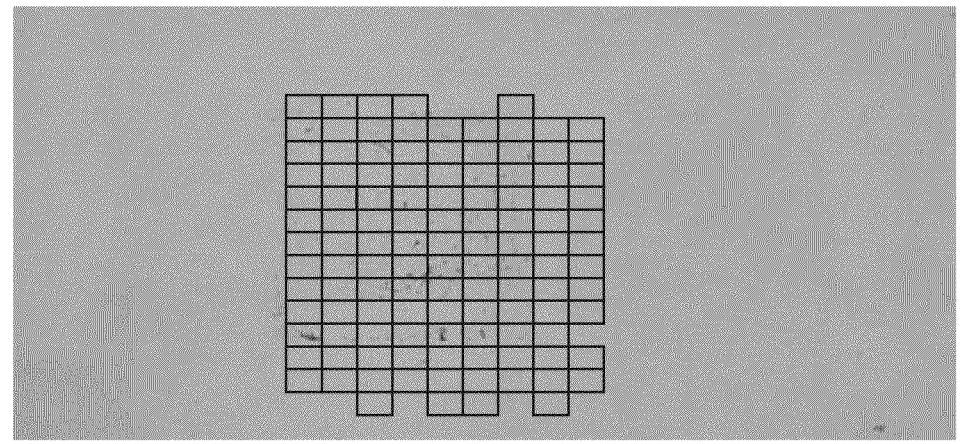

FIG. 16 are diagrams showing examples of a detection result according to this embodiment and the comparative example. FIG. 16A shows a detection result according to the comparative example, and FIG. 16B shows a detection result according to this embodiment. FIGS. 16A and 16B each show segment areas in which a target object is determined to be present. As shown in the figures, in the detection result according to the comparative example shown in FIG. 16A, a segment area with a pale target object, that is, a segment area with a small luminance difference is not determined as including a target object. On the other hand, in the detection result according to this embodiment shown in FIG. 16B, a segment area that is not determined as including a target object in the comparative example is also determined as including a target object. In other words, according to this embodiment, a target object can be detected without omission.

Figures 17A, 17B:
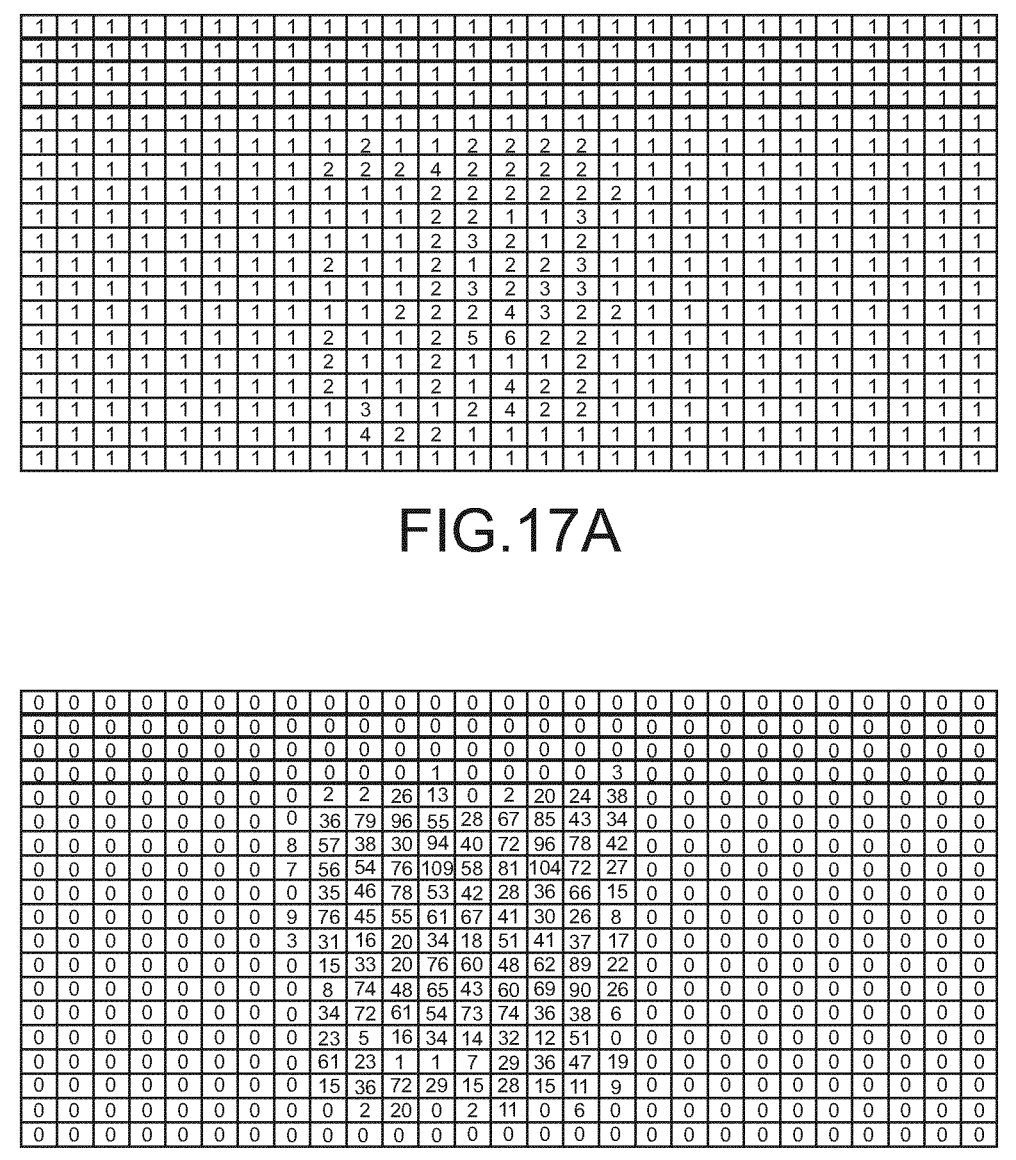

Further, in this embodiment, an adjustment of a detection sensitivity based on an adjustment of a determination parameter is simple. FIG. 17 show examples of a standard deviation for each segment area according to the comparative example and this embodiment. FIG. 17A is an example according to the comparative example, and FIG. 17B is an example according to this embodiment. The values of the standard deviation shown in the figures are rounded off. As shown in the figures, in this embodiment, there are larger differences in the standard deviations of the segment areas than in the comparative example. The reason is as follows. While the standard deviations are obtained directly from luminance values of pixels in the comparative example, the standard deviations are obtained after binarization by the edge detection processing in this embodiment, with the result that the differences in the luminance values are emphasized.

FIG. 18 are diagrams showing results of the user adjusting the determination parameter in the comparative example. FIG. 18 show segment areas having a standard deviation equal to or larger than the determination parameter, that is, a detection area in cases where the determination parameter is set to "1" (FIG. 18A), the determination parameter is set to "2" (FIG. 18B), and the determination parameter is set to "3"

(FIG. 18C). As shown in the figures, a range of the detection area largely differs when the determination parameter differs by 1.

Figure 19A:
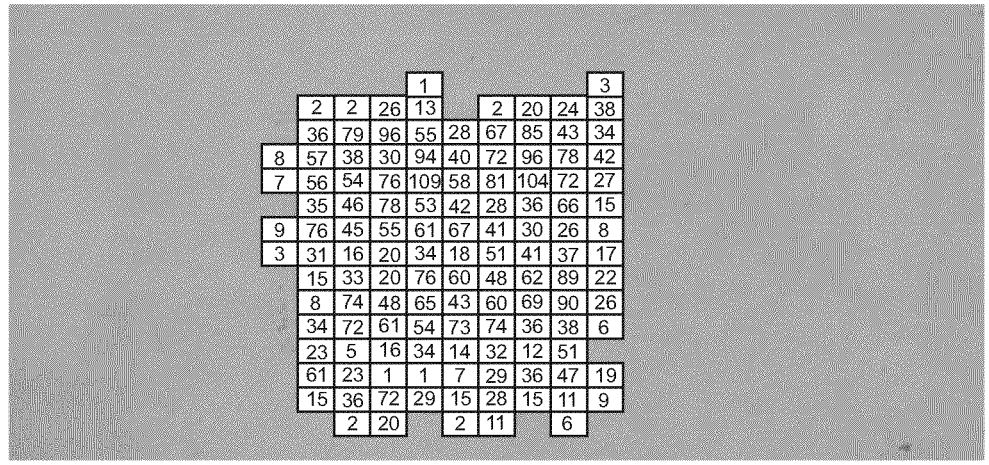
FIGS. 19A-C are diagrams showing results of adjusting the determination parameter according to this embodiment.
Figure 19B:
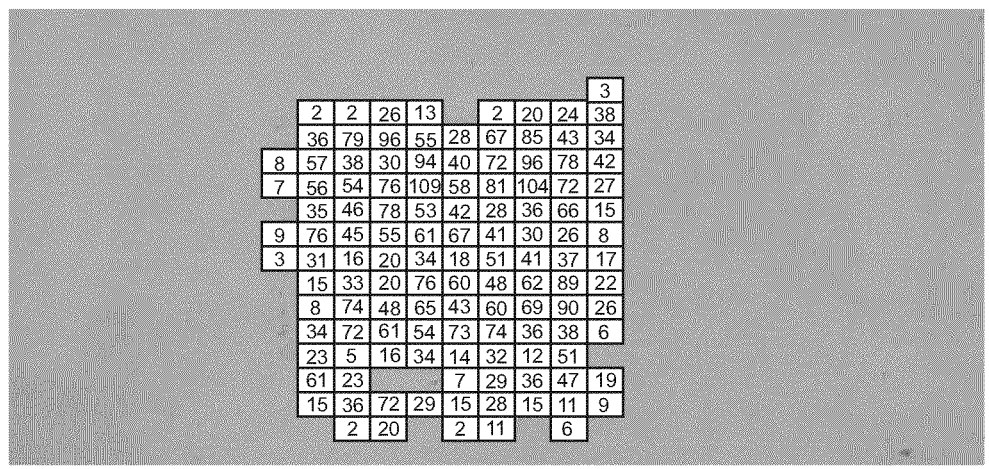
Figure 19C:
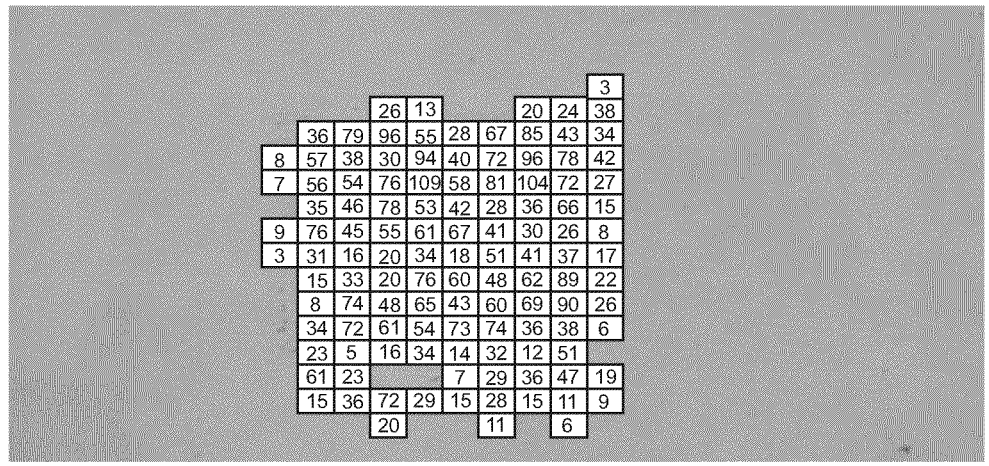
Figure 20A:
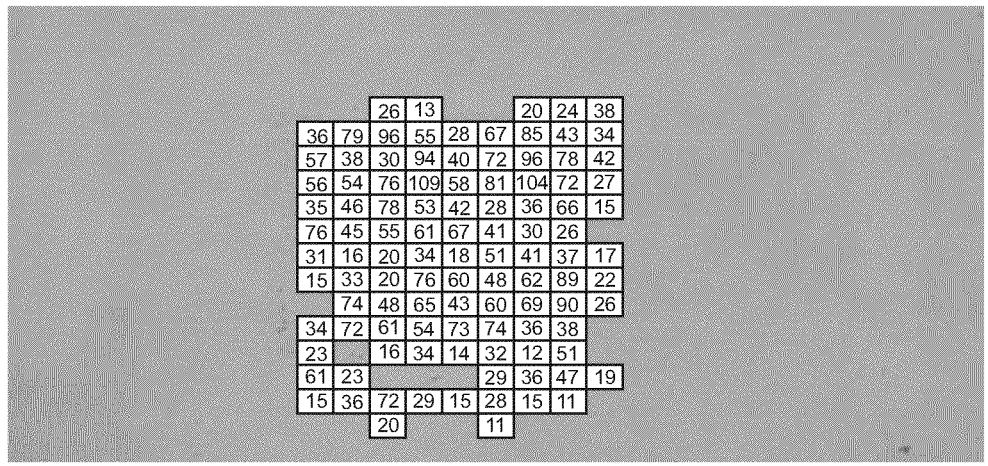
FIGS. 20A-C are diagrams showing results of adjusting the determination parameter according to this embodiment.
Figure 20B:
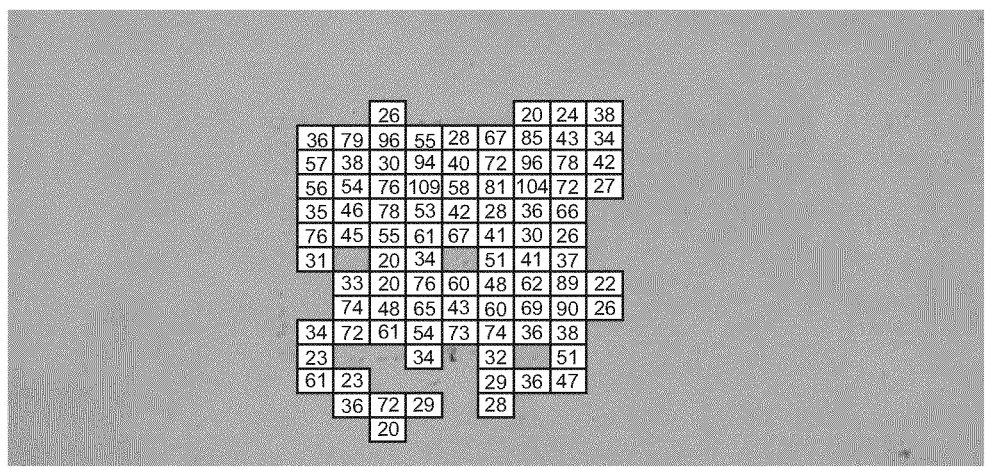
Figure 20C:
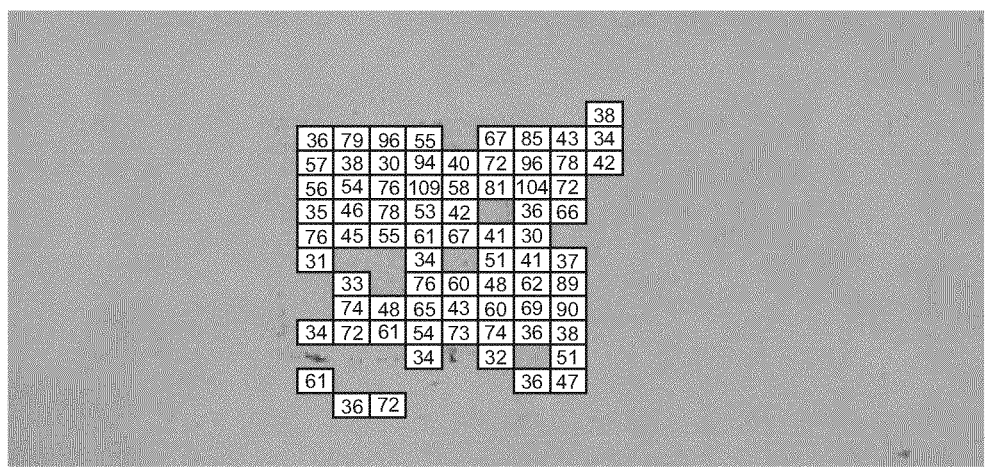
Figure 21A:
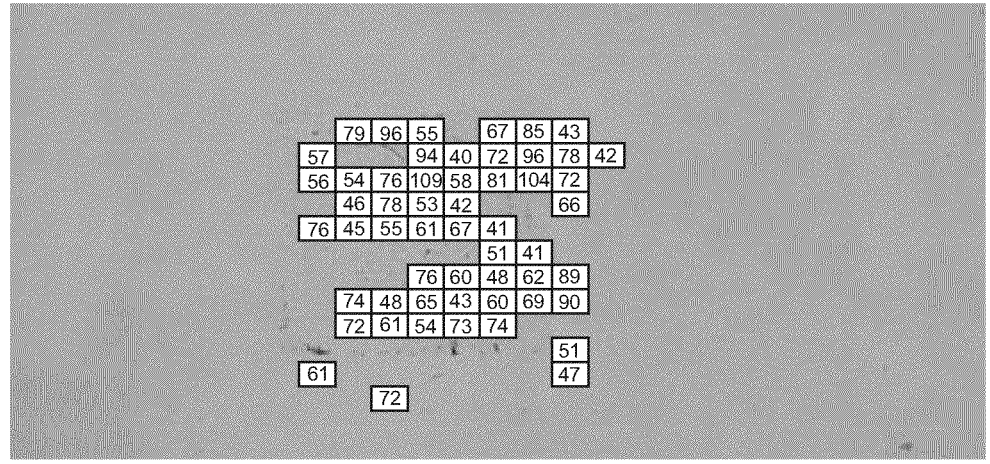
FIGS. 21A-C are diagrams showing results of adjusting the determination parameter according to this embodiment.
Figure 21B:
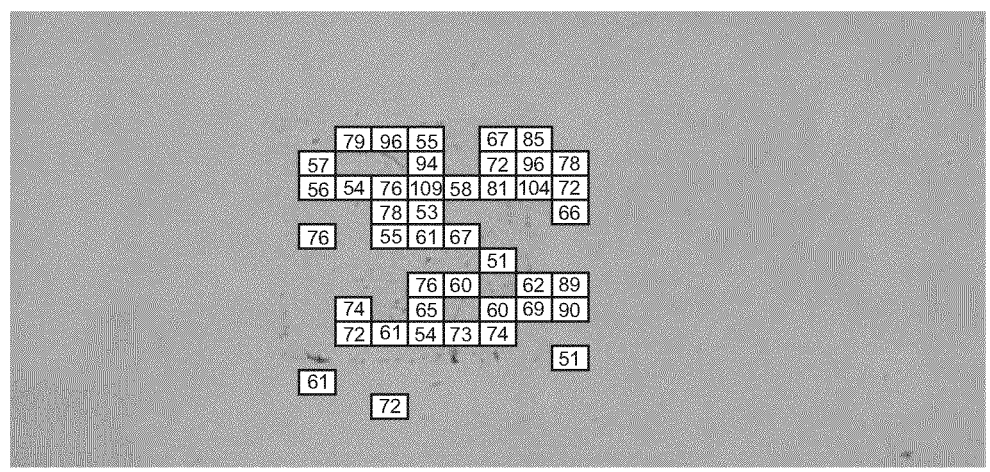
Figure 21C:
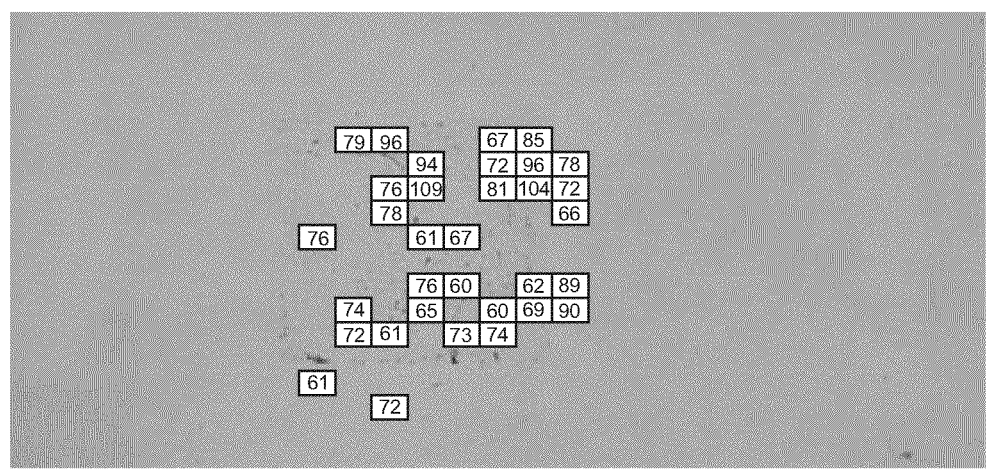

FIGS. 19 to 21 are diagrams showing results of the user adjustment the determination parameter according to this embodiment. FIG. 19 show detection areas in cases where the determination parameter is set to "1" (FIG. 19A), the determination parameter is set to "2" (FIG. 19B), and the determination parameter is set to "3" (FIG. 19C). FIG. 20 show detection areas in cases where the determination parameter is set to "10" (FIG. 20A), the determination parameter is set to "20" (FIG. 20B), and the determination parameter is set to "30" (FIG. 20C). FIG. 21 show detection areas in cases where the determination parameter is set to "40" (FIG. 21A), the determination parameter is set to "50" (FIG. 21B), and the determination parameter is set to "60" (FIG. 21C). As shown in the figures, even when the determination parameters differ more or less, the range of the detection areas hardly fluctuate.

Figure 22:
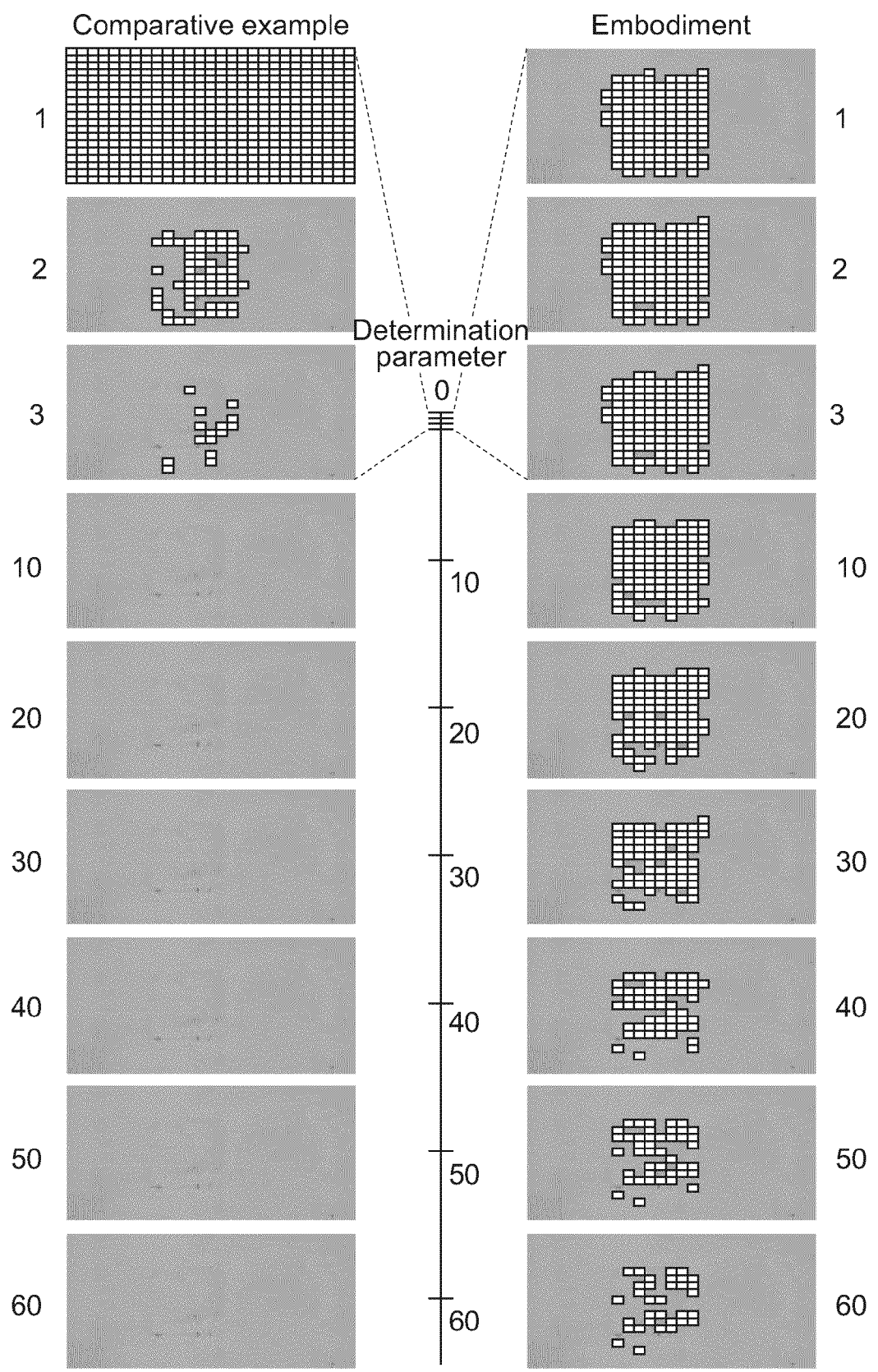
FIG. 22 is a diagram for comparing changes of a detection area based on the determination parameter according to this embodiment and the comparative example.

FIG. 22 are diagrams comparing changes of detection areas based on the determination parameter according to the comparative example and this embodiment. As shown in the figures, in the case of the comparative example, the determination parameter can only be adjusted by 3 steps, and the change of the detection area per step is large. In contrast, in this embodiment, the determination parameter can be adjusted by many steps, and the change of the detection area per step is small. In other words, according to this embodiment, the detection sensitivity can be adjusted flexibly by a user.

Regarding Color Conversion of Original Image

As described above, the image processing apparatus 1 performs detection processing on a detection target image selected from an original image acquired by the original image acquisition section 10. Here, the original image acquisition section 10 may perform a color conversion on the acquired original image. For example, by a color conversion of an image obtained by photographing a sample dyed by fluorescent staining, the detection processing can be performed by the method described above.

Figure 23A:
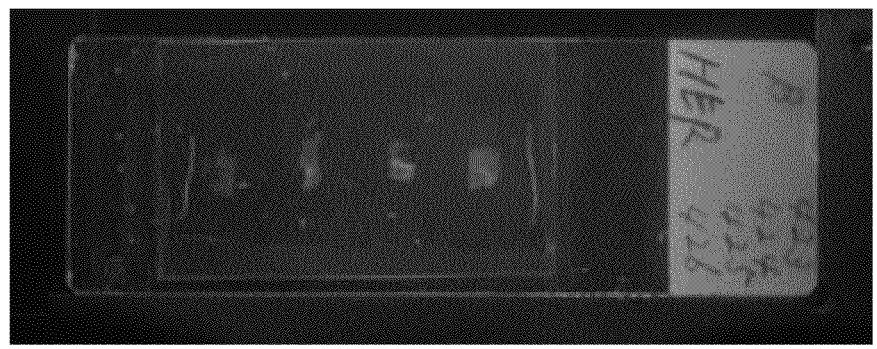
FIGS. 23A-B are examples of an original image obtained by photographing a sample dyed by fluorescent staining and an image obtained by changing a color of the original image according to this embodiment.
Figure 23B:
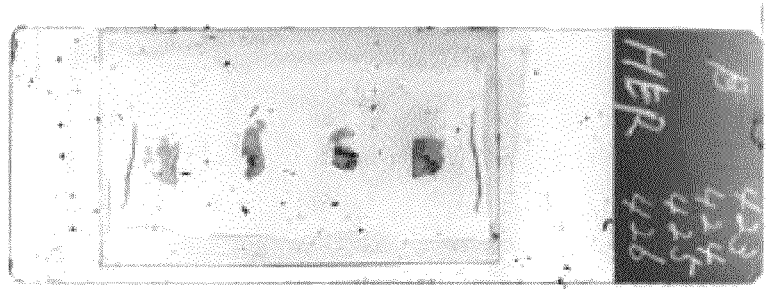
Figure 24A:
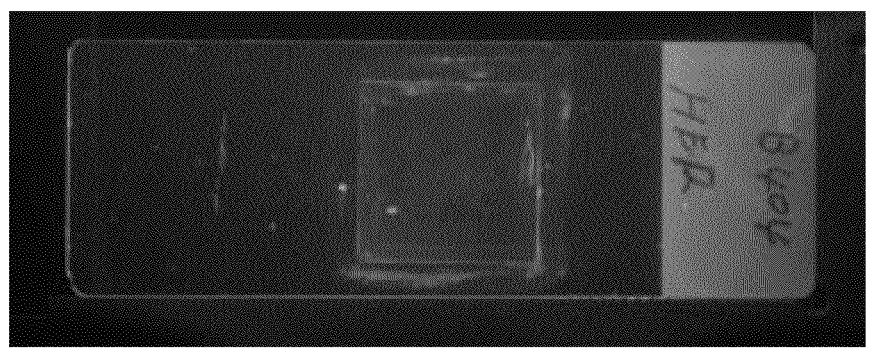
FIGS. 24A-B are examples of an original image obtained by photographing a sample dyed by fluorescent staining and an image obtained by changing a color of the original image according to this embodiment.
Figure 24B:
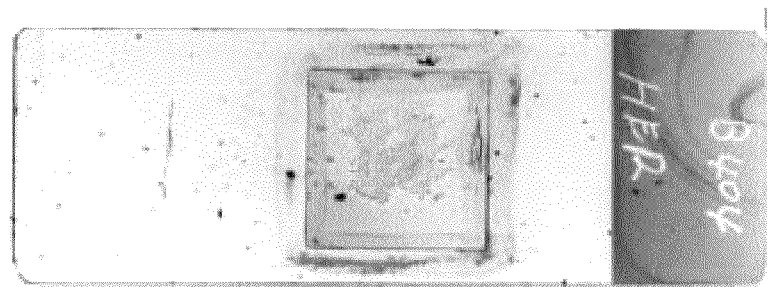
Figure 25A:
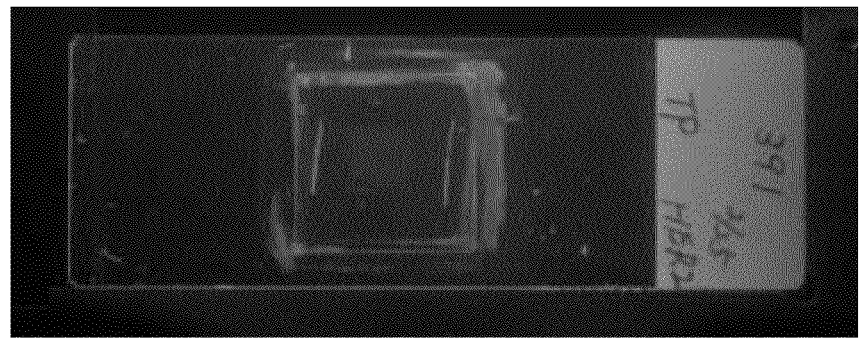
FIGS. 25A-B are examples of an original image obtained by photographing a sample dyed by fluorescent staining and an image obtained by changing a color of the original image according to this embodiment.
Figure 25B:
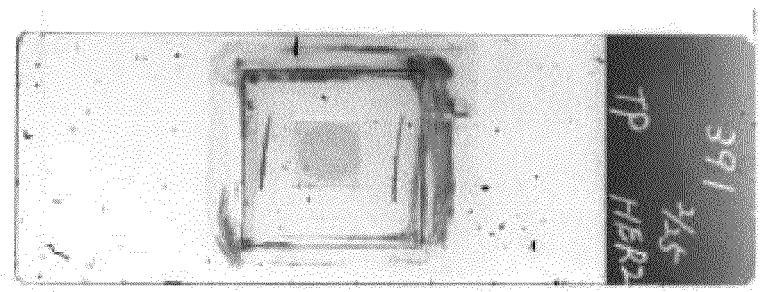
Figure 26A:
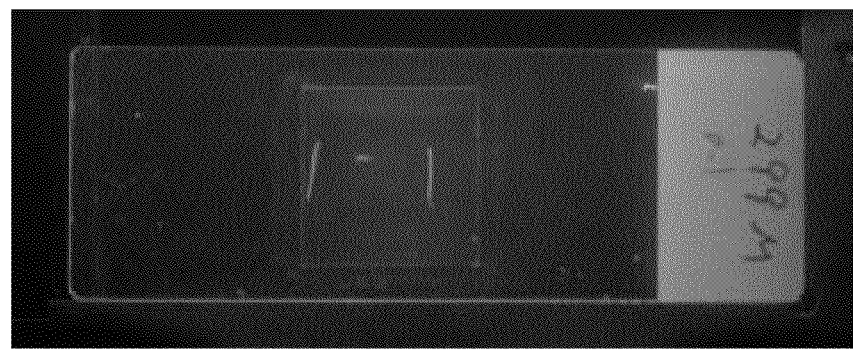
FIGS. 26A-B are examples of an original image obtained by photographing a sample dyed by fluorescent staining and an image obtained by changing a color of the original image according to this embodiment.
Figure 26B:
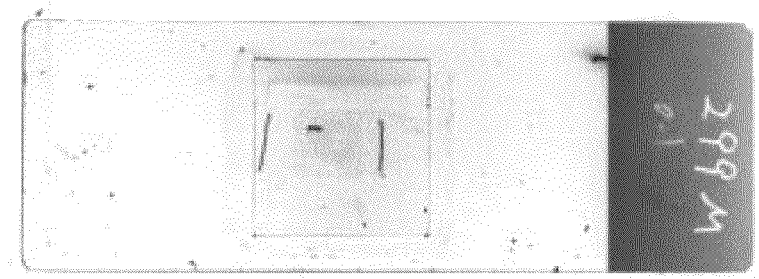
Figure 27A:
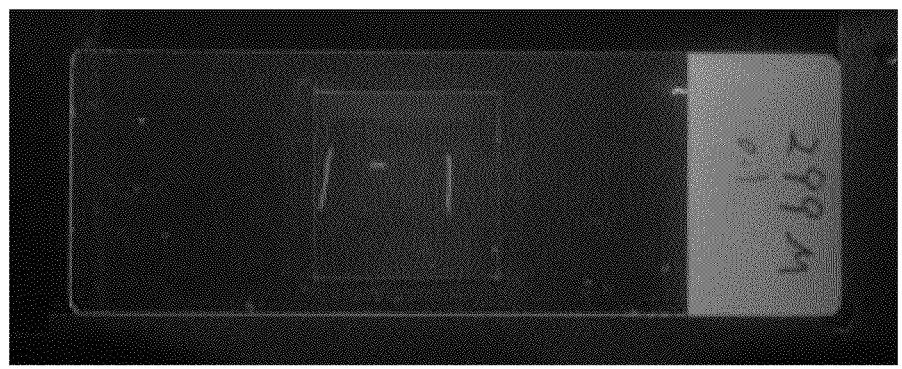
FIGS. 27A-B are examples of an original image obtained by photographing a sample dyed by fluorescent staining and an image obtained by changing a color of the original image according to this embodiment.
Figure 27B:
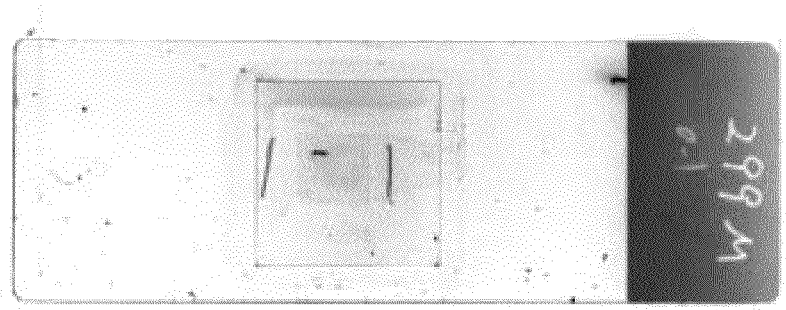

FIG. 23A is an example of an original image obtained by photographing a sample dyed by fluorescent staining. It should be noted that the image shown in the figure is taken under irradiation of ultraviolet rays having a wavelength of 365 nm and is originally of a bluish color. The original image acquisition section 10 performs a color conversion on the image and generates a color-converted original image shown in FIG. 23B (hereinafter, referred to as color-converted image).

Specifically, the original image acquisition section 10 performs the color conversion on pixels of the original image using the following (Expression 2), (Expression 3), and (Expression 4).

$$R_{out}=300-1.5**B_{in} \quad \text{(Expression 2)}$$

$$G_{out}=300-2*B_{in} \quad \text{(Expression 3)}$$

$$B_{out}=300-1.3*B_{in} \quad \text{(Expression 4)}$$

In the expressions, $B_{in}$ is luminance of "blue" in pixels of the original image. $R_{out}$ is luminance of "red" in pixels of the color-converted image, $G_{out}$ is luminance of "green" in pixels of the color-converted image, and $B_{out}$ is luminance of "blue" in pixels of the color-converted image. In other words, by (Expression 2), (Expression 3), and (Expression 4), RGB luminance of the color-converted image is calculated from the luminance of "blue" in pixels of the original image. Moreover, at this time, by subtracting from a predetermined value (300 above) a value obtained by multiplying a predetermined coefficient to the luminance of "blue" in pixels of the original image, a color is inverted. It should be noted that the predetermined value and coefficient can be changed as appropriate.

FIGS. 24 to 27 additionally show examples of the color conversion. FIGS. 24A, 25A, 26A, and 27A show original images obtained by photographing a sample dyed by fluorescent staining, and FIGS. 24B, 25B, 26B, and 27B show color-converted image as in FIG. 23. By such color conversion processing, the color of the image of the sample dyed by fluorescent staining becomes close to that of HE staining, with the result that the image processing apparatus 1 is enabled to perform the detection processing.

As described above, in this embodiment, by the edge detection processing section 12 performing the edge detection processing on a detection target image, a luminance gradient among pixels included in the detection target image is emphasized, and the image is binarized into edge pixels and non-edge pixels. As a result, if there is even a slight luminance gradient in the segment area, the luminance gradient is reflected on the edge component index value calculated by the index value calculation section so that the target object determining section can determine the segment area as a segment area in which a target object is present. Therefore, even in an image having a small luminance difference between a target object and a background, a segment area including a target object can be detected accurately.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An image processing apparatus, comprising:
   an edge detection processing section configured to generate an edge image by performing edge detection processing on a detection target image from which a target object is to be detected;
   a segment area setting section configured to segmentalize the edge image into a plurality of segment areas;
   an index value calculation section configured to calculate, for each of the plurality of segment areas, an edge component index value that indicates an amount of edge components included in each segment area; and
   a target object determining section configured to determine whether there is an image of the target object in each segment area based on the edge component index value.

2. The image processing apparatus according to claim 1, wherein the edge detection processing section uses a luminance gradient of the detection target image in the edge detection processing.

3. The image processing apparatus according to claim 2, wherein the edge detection processing section performs the edge detection processing based on a detection parameter that defines a level of the luminance gradient detected as an edge, the detection parameter being instructed by a user.

4. The image processing apparatus according to claim 3, wherein the edge component index value is a standard deviation of luminance of pixels included in each segment area.

5. The image processing apparatus according to claim 4, wherein the edge detection processing section uses a Canny algorithm as an algorithm of the edge detection processing.

6. An image processing method, comprising:
- generating, by an edge detection processing section, an edge image by performing edge detection processing on a detection target image from which a target object is to be detected;
- segmentalizing, by a segment area setting section, the edge image into a plurality of segment areas;
- calculating, by an index value calculation section, for each of the plurality of segment areas, an edge component index value that indicates an amount of edge components included in each segment area; and
- determining, by a target object determining section, whether there is an image of the target object in each segment area based on the edge component index value.

7. A non-transitory computer readable storage medium storing an image processing program causing a computer to function as:
- an edge detection processing section configured to generate an edge image by performing edge detection processing on a detection target image from which a target object is to be detected;
- a segment area setting section configured to segmentalize the edge image into a plurality of segment areas;
- an index value calculation section configured to calculate, for each of the plurality of segment areas, an edge component index value that indicates an amount of edge components included in each segment area; and
- a target object determining section configured to determine whether there is an image of the target object in each segment area based on the edge component index value.

* * * * *